United States Patent [19]

Dull et al.

[11] Patent Number: 4,766,727

[45] Date of Patent: Aug. 30, 1988

[54] FLUID CONTROL VALVE

[75] Inventors: David A. Dull, Lafayette; Richard K. Taden, Remington, both of Ind.

[73] Assignee: Dyneer Corporation, Scottsdale, Ariz.

[21] Appl. No.: 56,870

[22] Filed: Jun. 1, 1987

[51] Int. Cl.⁴ .............................................. F16D 31/02
[52] U.S. Cl. ....................................... 60/427; 60/493; 137/625.48; 180/242
[58] Field of Search .............................. 180/242, 243; 137/625.48, 625.64; 251/30.03, 30.01; 60/721, 484, 493, 427

[56] References Cited

U.S. PATENT DOCUMENTS

| | | |
|---|---|---|
| 3,292,723 | 12/1966 | Pinkerton et al. . |
| 3,426,799 | 2/1969 | Kintner ........................ 137/625.48 |
| 3,458,005 | 7/1969 | Malm et al. . |
| 3,480,099 | 11/1969 | Nighswonger et al. . |
| 3,481,419 | 12/1969 | Kress et al. . |
| 3,552,516 | 1/1971 | Beard . |
| 3,680,652 | 8/1972 | Greene . |
| 3,698,682 | 10/1972 | Berning et al. ................. 251/30.03 |
| 3,780,820 | 12/1973 | Schwab et al. . |
| 3,811,525 | 5/1974 | Stuart . |
| 3,841,423 | 10/1974 | Holtkamp et al. . |
| 3,900,075 | 8/1975 | Chichester et al. . |
| 3,910,369 | 10/1975 | Chichester et al. . |
| 3,916,625 | 11/1975 | Holtkamp . |
| 3,918,546 | 11/1975 | Chichester et al. . |
| 3,978,937 | 9/1976 | Chichester et al. . |
| 4,121,610 | 10/1978 | Harms et al. ........................ 137/117 |
| 4,140,196 | 2/1979 | Brewer . |
| 4,142,600 | 3/1979 | Campbell . |
| 4,183,419 | 1/1980 | Henn et al. . |
| 4,236,595 | 12/1980 | Beck et al. . |
| 4,241,577 | 12/1980 | Baldauf . |
| 4,244,184 | 1/1981 | Baldauf et al. . |
| 4,295,539 | 10/1981 | Beck et al. . |
| 4,554,991 | 11/1985 | Eden . |

Primary Examiner—Edward K. Look
Attorney, Agent, or Firm—George Pappas

[57] ABSTRACT

A fluid control valve for controlling the flow of hydraulic fluid at a high pressure from a primary pump and the flow of the hydraulic fluid at a low charge pressure from a charge pump to cam-lobe type hydraulic motors which are used to assist in driving a vehicle. When energizing the motors, charge pressure is first delivered to the motors. Thereafter, all of the supply and return lines leading to the motors and to the primary pump and the charge pump are connected together to further increase the pressure delivered to the motors. Finally, the charge pressure line is disconnected and the supply and return lines leading to the motors are connected to the high pressure supply and return lines leading to the primary pump. When the supply and return lines leading to the motors are disconnected from the primary pump, the lines leading to the motors are drained into a reservoir. An accumulator is provided within the motors to absorb sudden pressure delivered thereto. Notches are placed on the spool for further gradually introducing the high pressure fluid to the supply and return lines of the motors. The flow of charge pressure fluid which controls the shifting of the spool is restricted by an orifice to control the rate of shifting and to provide sufficent time for gradually introducing the high pressure to the motors.

32 Claims, 5 Drawing Sheets

FLUID CONTROL VALVE

BACKGROUND OF THE INVENTION

This invention generally relates to a fluid control valve and, more particularly, to a fluid control valve for selectively controlling the flow of a hydraulic fluid at two different pressures to fluid motors. Further yet, this invention relates to a fluid control valve for selectively energizing and deenergizing power assist hydraulic motors coupled to wheels while the high pressure primary hydraulic supply pump is running and, further, while the wheels are rotating.

Vehicles, such as combines, construction fork trucks, road pavers, and vibratory drum rollers are many times driven with a main power source such as from a primary pump coupled to a combustion engine or directly with the combustion engine and by driving the front wheels of the vehicle. Further, the steerable wheels are also often equipped with hydraulic powered motors so as to assist in driving the vehicle. In this fashion, a four-wheel drive vehicle is provided for better performing in rough and slippery terrain such as muddy fields and construction sites.

However, when driving the vehicle i.e., "roading" from field to field or from construction site to construction site, it is most advantageous to disengage the rear wheel hydraulic motors as they are basically not needed and, in fact, unnecessarily heat up and decrease the overall efficiency of the vehicle. Furthermore, such driving of the hydraulic assist motors tend to cause them to fail prematurely. In the past, the rear wheel hydraulic motors have been disengaged from the hydraulic system by first stopping the vehicle, shutting down the combustion engine driving the primary pump or disengaging the primary pump itself and, thereafter, getting out of the vehicle and manually disengaging the hydraulic motors. As can be appreciated, this method of engaging and disengaging the rear wheel assist motors is cumbersome, time-consuming, and also potentially dangerous depending on where the operator must reach so as to disengage the motors.

SUMMARY OF THE INVENTION

It is the principle object of the invention to overcome the above-discussed disadvantages associated with earlier methods of engaging and disengaging rear wheel or, as is sometimes the case, front wheel assist motors. Further, it is an object of the invention to control the energizing and deenergizing of the hydraulic assist motors from a remote location such as the cab of the vehicle. Further yet, it is an object of the present invention to be able to energize and deenergize the hydraulic power assist motors while the pump connected thereto is running and, also, while the vehicle is traveling and the wheels and the power assist motors are turning. It is also an object of the invention to utilize, in combination with the control valve, cam lobe-type hydraulic motors.

The objects of the invention are obtained, in a preferred form of the invention, by providing a fluid control valve for controlling the flow of a fluid at a first high pressure and the flow of the fluid at a second low charge pressure to the cam lobe-type hydraulic assist motors. The control valve includes a two-position five-way valve in combination with a two-position four-way solenoid valve. The two-position five-way valve, in its first closed position, disconnects the high pressure supply and return lines from the primary pump from the return and supply lines leading to the assist motors. Further, in this first closed position, the supply and return lines leading to the assist motors are drained to the reservoir. Upon energizing the solenoid valve and shifting the same to its second or flow position, charge pressure is temporarily delivered to the assist motors through the two-position five-way valve thereby increasing the pressure supplied to the assist motors and urging the rollers of the motors toward the cam-formed bosses. In shifting from its first closed to its second flow position, the two-position five-way valve includes an intermediate position whereat the supply and return lines from the primary pump, the supply and return lines leading to the assist motors and the line carrying charge pressure are all connected together so that the pressure delivered to the assist motors is further gradually increased. Once the two-position five-way valve reaches its second or flow position, the supply and return lines from the primary pump are connected to the respective supply and return lines leading to the assist motors and, further, the line connected to charge pressure is disconnected. As can be appreciated, through the operation of the control valve, the energizing and deenergizing of the assist motors is accomplished electrically from a remote location, such as the cab of the vehicle and, further, because the pressure delivered to the assist motors is introduced gradually, the motors are not damaged even though the energization and deenergization occurs while the primary pump is running and while the assist motors are turning.

To further decrease the impact of the high pressure fluid when energizing the assist motors, an accumulator is provided within the assist motors so as to absorb any sudden pressure which may be delivered thereto. Flow dividers are also provided, in line with the supply and return lines leading to the assist motors, so as to deliver the high pressure fluid to each respective assist motor according to need and depending on the friction which the wheels encounter. So as to further assist in gradually introducing the high pressure hydraulic fluid into the assist motors, notches are provided on the spool of the two-position five-way valve. As the spool is shifting toward its flow position, the notches cause a gradual quantity of high pressure hydraulic fluid to be passed to the assist motors.

The invention, in one form thereof, is a valve for selectively controlling the flow of a fluid at a first pressure and the flow of the fluid at a second pressure including a first pressure input, a second pressure input, and a fluid output. A spool is provided for selectively directing the fluid at a first pressure from the first pressure input to the fluid output. Spool control means is provided for shifting the spool between a closed position and a flow position and a channel is provided for directing the fluid at the second pressure from the second pressure input to the fluid output when the spool is being shifted from the closed position to the flow position.

The invention, in one form thereof, is a valve for selectively controlling the flow of a fluid at a first pressure through the use of a fluid at a second pressure including a first pressure input, a second pressure input, and a fluid output. A spool is provided for selectively directing the fluid at the first pressure from the first pressure input to the fluid output. Spool control means is provided for shifting the spool through the use of the fluid at the second pressure between a closed position and a flow position. A channel is also provided for directing the fluid at the second pressure from the second pressure input to the fluid output when the spool is being shifted from the closed position to the flow position.

The invention, in one form thereof, is a two-position five-way valve for controlling the flow of a fluid at a first pressure and the flow of the fluid at a second pressure. A first and a second port are provided for connecting two respective supply and return lines of the fluid at the first pressure. A third and a fourth port are provided for connecting two respective supply and return lines of a pressure-operating mechanism. A fifth port is also provided. Valve control means for selectively shifting the position of the two-position five-way valve between a first closed position and a second open position and for selectively causing the fifth port to communicate with either a reservoir or the fluid at the second pressure is provided. When the two-position five-way valve is in its first closed position, the third and fourth ports communicate with the fifth port and the valve control means causes the fifth port to communicate with the reservoir and the first and second ports are closed. When the two-position five-way valve is in its second open position, the fifth port is closed and the first and second ports communicate with respective third and fourth ports thereby causing the fluid at the first pressure to be supplied to and returned from the pressure-operating mechanism. When the two-position five-way valve is being shifted from the first closed position to the second open position, the third and fourth ports temporarily communicate with the fifth port while the valve control means causes the fifth port to communicate with the fluid at the second pressure thereby temporarily causing fluid at the second pressure to be delivered to the pressure-operating mechanism.

The invention, in one form thereof, is a method for energizing and deenergizing a pressure-operating mechanism with a fluid at a first pressure and a fluid at a second pressure and through the use of a valve having a first pressure input connected to the fluid at the first pressure, a second pressure input selectively connected to either the fluid at the second pressure or a reservoir, and spool means for providing selective communication between the first and the second pressure inputs and the fluid output. The pressure-operating mechanism is deenergized by disconnecting the first pressure input from the fluid output and connecting the fluid output to the second pressure input thereby allowing residual pressure within the pressure-operating mechanism to drain into the reservoir. The pressure-operating mechanism is energized by first connecting the fluid output to the second pressure input thereby first providing fluid at the second pressure to the pressure-operating mechanism and, thereafter, connecting the first pressure input to the fluid output and disconnecting the fluid output from the second pressure input, thereby providing fluid at the first pressure to the pressure-operating mechanism and fully energizing the pressure-operating mechanism.

BRIEF DESCRIPTION OF THE DRAWINGS

The above-mentioned and other features and objects of the invention and the manner of obtaining them will become more apparent and the invention itself will be better understood by reference to the following description of an embodiment of the invention taken in conjunction with the accompanying drawings wherein.

Corresponding reference characters indicate corresponding parts throughout the several views of the drawings.

DETAILED DESCRIPTION OF A PREFERRED EMBODIMENT

Figure 1:
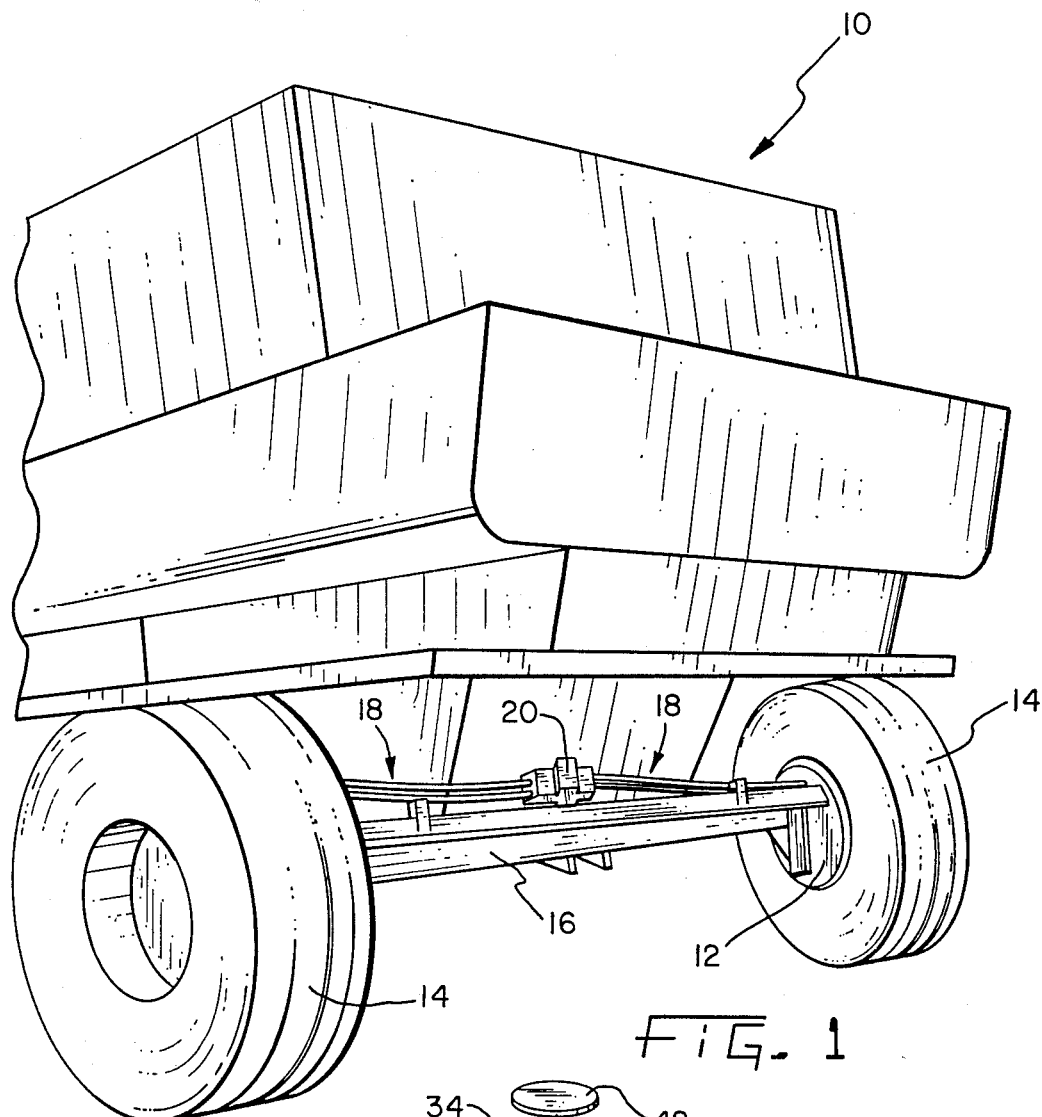
FIG. 1 is a perspective view of the rear end of a combine including the control valve of the present invention hydraulically connected to rear wheel assist motors.

Referring to FIG. 1, there is shown a vehicle 10 upon which a specific embodiment of the present invention can be used. Vehicle 10, as generally shown, represents the rear part of a harvesting combine. An axle 16 is rigidly connected to the rear end of vehicle 10. Axle 16 has pivotally connected at its two outermost ends wheels 14 through which, by pivoting in a known and customary fashion, vehicle 10 can be steered. Each of wheels 14 are independently driven by hydraulic fluid assist motors 12 which are located substantially in the hubs of wheels 14. Motors 12 are powered with pressurized hydraulic fluid which is supplied thereto through the use of motor hydraulic supply and return lines 18. Lines 18 are connected to control valve 20 which controls the supply of hydraulic fluid, through lines 18, to each of motors 12.

The specific embodiment of control valve 20, as described herein, is used on a vehicle 10 having a primary power system for driving its front wheels 22. Rear wheel motors 12 are provided for assisting the primary drive system and are energized and deenergized through the use of control valve 20. The combination of drive-assisting motors 12 and control valve 20 can also be used at the front end of a vehicle when the rear wheels are powered by the primary drive system. The term "primary drive system", as used herein, refers to the driving system of vehicle 10 through the use of hydraulic motors powered by a pump or directly through the use of a combustion engine.

Figure 2:
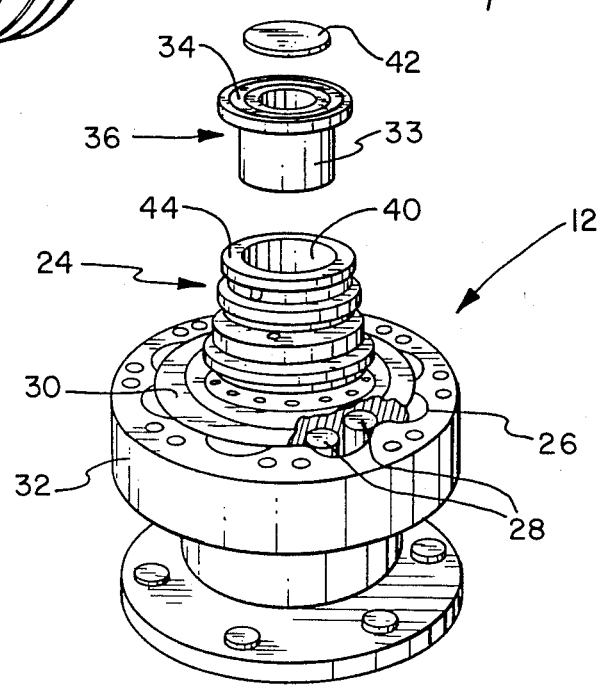
FIG. 2 is a perspective partial cut-away view of a cam lobe-type hydraulic motor shown in FIG. 1 and further showing an accumulator.

As more clearly shown in FIG. 2, hydraulic motors 12 are of the cam lobe-type which, in general, force rollers 28 against cam-formed bosses 26 through the use of pistons (not shown) supplied with hydraulic pressure so as to produce torque. Rollers 28 and their respective pistons are located within cylinder block 30 and are further situated radially in a known and customary fashion. Cylinder block 30 is located within housing 32. On the interior of housing 32 there are provided cam-formed bosses 26. Hydraulic fluid is provided to the respective pistons within cylinder block 30 through the use of distributor 24 in a known and customary fashion so that the torque, provided by motor 12, is maximized and so that a stalling situation is avoided.

An accumulator 36 utilizing a diaphragm is situated within cylindrical opening 40 of distributor 24. A cover member or plate (not shown) is received over distributor 24 and accumulator 36 and is bolted to housing 32. The cover member keeps accumulator 36 in place inside the wheel motors 12 and opening 40. The accumulator 36 consists or is made of a rubber diaphragm 33, and a steel reinforcing ring 34 and a circular rubber piece 42 that is bonded to diaphragm 33 thus encapsulating ring 34 and forming an enclosed air pocket. Accumulator 36 absorbs any sudden high pressures which may be experienced within motor 12 and, thus, prevents the cover member and other parts of motor 12 from collapsing and/or being damaged through sudden impacts. It should be noted that accumulation of sudden pressure within motor 12 generally occurs when hydraulic fluid is initially introduced to motor 12 so as to drive the same. The severity and the probability of this sudden pressure accumulation is multiplied when, prior to energizing the motor with high pressure hydraulic fluid (generally 3,000–6,000 psi), all of the rollers and pistons connected thereto have been radially retracted by allowing rollers 28 to rotate within housing 32 without high pressure hydraulic fluid applied thereto. Accordingly, when high pressure hydraulic fluid is suddenly provided to the pistons, all in their retracted position, rollers 28 are forced radially outwardly toward cam-formed bosses 26 thereby suddenly entering the space between cylinder block 30 and cam-formed bosses 26 and causing a sudden accumulation of pressure within motor 12. Accumulator 36, thus, acts to absorb this sudden accumulation of pressure so that the various parts of motor 12 are not damaged.

If for some reason the accumulator 36 fills with oil due to a rupture, the pressure accumulation described herein may first cause the cover member to deform and allow leakage past the cover member seal. This is easily repaired by replacing the cover member and accumulator. More severe or prolonged pressure accumulation may cause the wheel motor shaft seal to fail.

On many occasions, however, accumulator 36 may not absorb the sudden pressure created within motor 12 when energizing and, therefore, control valve 20 is provided so as to gradually ease rollers 28 against cam-formed bosses 26 and, thereby decreasing the sudden high pressure which is experienced within motors 12 during energization. Further, control valve 20 is provided to, during roading when high pressure hydraulic fluid is not provided to motors 12, connect motors 12 to a reservoir 46. In this fashion, during roading, rollers 28 can rotate with the output shaft along with wheels 14 substantially without coming in contact with cam-formed bosses 26 thereby decreasing friction and the accumulation of heat within motors 12.

Figure 3:
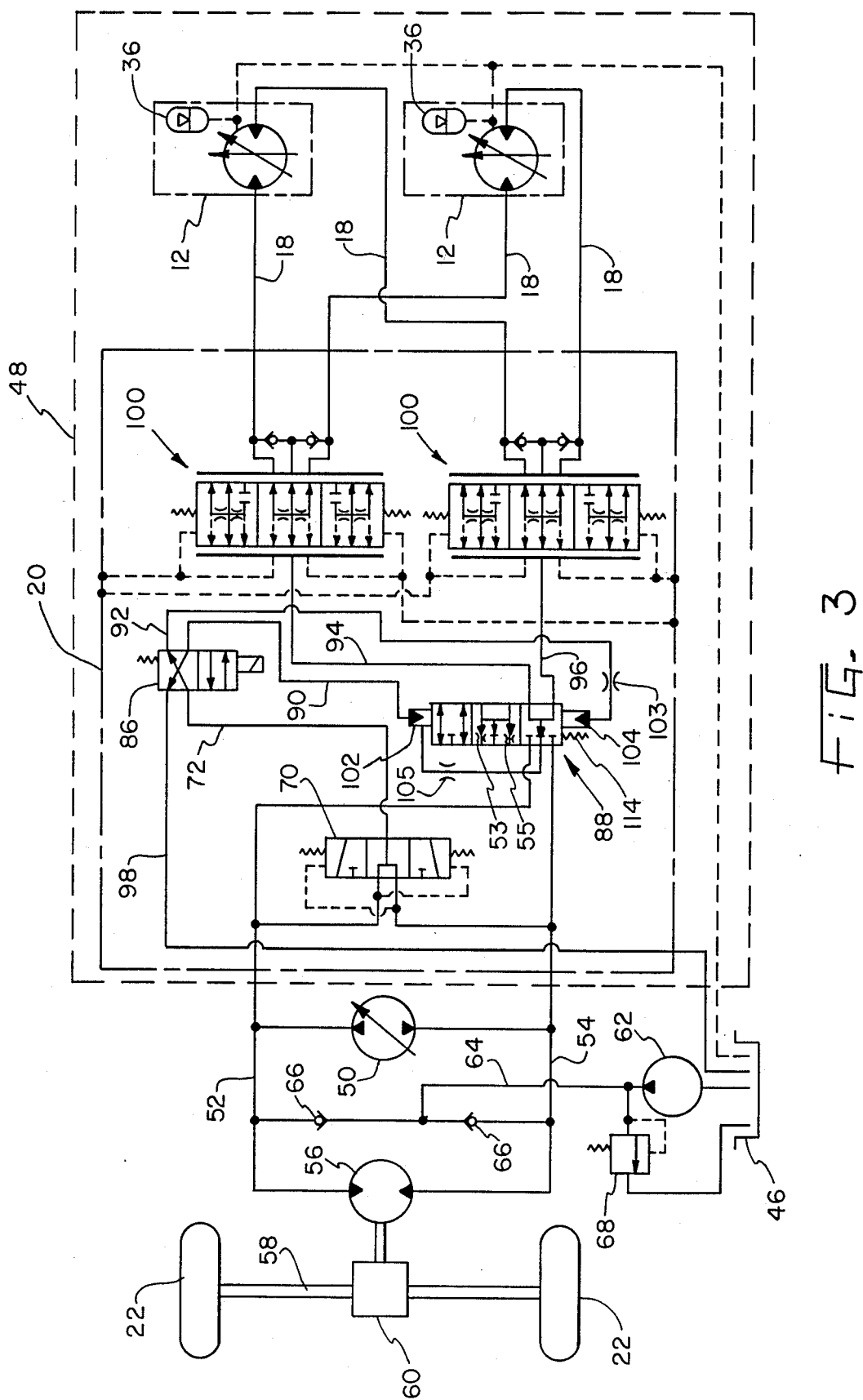
FIG. 3 is a schematic showing the hydrostatic system of the vehicle shown in FIG. 1 along with the control valve and the power assist hydraulic motors.

Referring now to FIG. 3 where the hydrostatic or hydraulic system of vehicle 10 is shown schematically, control valve 20 is shown within the short-long dashed line and the rear wheel assist system 48, including motors 12, is shown within the dashed line. A primary pump 50 is provided capable of pumping hydraulic fluid at a pressure of up to approximately 6,000 psi. Primary pump 50 can be operated in a forward or reverse direction thereby selectively providing high pressure to either of lines 52 or 54 to which pump 50 is connected. Lines 52 and 54 are connected to primary hydraulic motor 56, which is coupled through gear train 60 and primary axle 58 to front wheels 22. Accordingly, vehicle 10 can be driven with the primary drive system in either the forward or reverse direction by selectively switching pump 50 between its forward and reverse flow directions.

A charge pressure pump 62 draws fluid from reservoir 46 and delivers charge pressure through line 64 and through either of the two check valves 66 to the return line of primary pump 50, which can be either line 52 or 54, depending on the flow direction which pump 50 is pumping. Charge pressure pump 62 is also connected to relief valve 68 which leads back to reservoir 46. Relief valve 68 is provided for limiting the charge pressure delivered to line 64.

Figure 7:
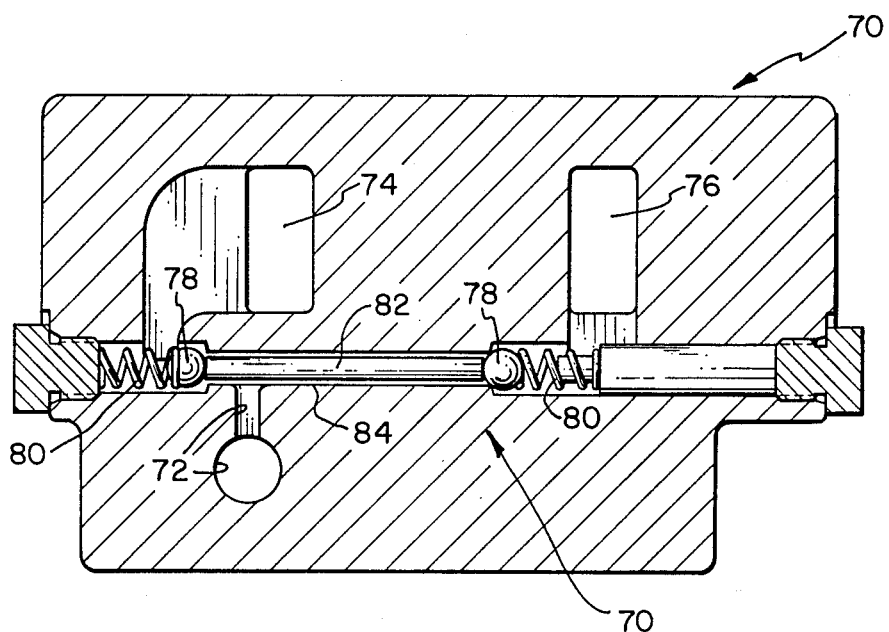
FIG. 7 is a cut-away view of the low pressure shuttle valve shown in FIG. 3.

Control valve 20, which is provided for selectively energizing and deenergizing motors 12, is also connected to lines 52 and 54 through which high pressure power hydraulic fluid is received from and returned to pump 50. A low pressure shuttle valve 70 is connected to lines 52 and 54 and functions to connect either of lines 52 or 54, which is carrying charge pressure, to line 72. As more clearly shown in the cut-away view of control valve 20, in FIG. 7, the low pressure shuttle valve generally indicated as 70 has two shuttle valve inputs 74 and 76 connected to lines 52 and 54 (not shown in FIG. 7). Two balls 78 are generally held near their sealing position with springs 80 and a rod 82 is situated between balls 78 and is adapted to allow only one of balls 78 to create a seal and prevent flow to line 72 at any particular time. Accordingly, in a known and customary fashion, the higher of the two pressures provided to either of shuttle inputs 74 or 76 causes its respective ball 78 to seal thereby pushing the other ball 78 associated with the lower pressure away from its seat and, thereby, allowing low pressure hydraulic fluid to enter rod channel 84, which is greater in diameter than rod 82 and exit through line 72. As can be appreciated, in the present embodiment, high pressure power hydraulic fluid within either of lines 52 or 54 is prevented from entering line 72 and instead, charge pressure provided within either of lines 52 or 54 is allowed to travel through low pressure shuttle valve 70 and into line 72.

Line 72 leads to and is connected to solenoid control two-position four-way valve 86. Valve 86 is connected to two-position five-way valve 88 through lines 90 and 92 and is adapted to control the position of valve 88. Valve 86 is shown in its first porting position, which is its deenergized or closed position. In this position, charge pressure is provided from line 72 to line 92 thereby biasing valve 88 in its closed or first porting position as shown. Valve 86, in its first porting position, also provides communication between line 90 and reservoir line 98 thereby allowing motor supply and return lines 94 and 96 leading to respective motors 12 through dividers 100 to drain into reservoir 46 whenever valve 88 is in its closed position and motors 12 are deenergized or placed in their "roading" position.

When solenoid valve 86 is energized, its second position is placed in operation wherethrough line 72 is connected to line 90 and line 92 is connected to line 98. In this position, charge pressure that was previously in line 92 is drained to reservoir 46 through line 98. Further, charge pressure is provided through line 90 to biasing port 102 and momentarily to lines 94 and 96 leading to motors 12 through dividers 100. With this momentary providing of charge pressure to motors 12 while valve 86 is its energized position and while valve 88 is in its first or closed position as shown in FIG. 3, rollers 28 are urged toward camformed bosses 26 with less force than if the high pressure power hydraulic fluid had immediately been introduced to motors 12.

Simultaneously with providing charge pressure to motors 12, valve 88 is biased through its intermediate position and, thereafter, to its open or flow position. In its intermediate center position, valve 88 connects all of lines 52, 54, 90, 94 and 96 together. Thus, because one of lines 52 or 54 is carrying high pressure power hydraulic fluid (3,000-6,000 psi), the pressure delivered to lines 94 and 96 is increased over the charge pressure previously provided to those lines when valve 88 was in its first or closed position and valve 86 was in its energized position. However, while valve 88 is in its intermediate position, the pressure to lines 94 and 96 will not generally increase as high as the pressure output of primary pump 50 because the flow of high pressure from line 52 or 54 to lines 94 and 96 is restricted by orifice 53 or 55. The rate of flow of high pressure from line 52 or 54 to lines 94 and 96 is determined by the size of orifice 53 or 55 and must be sufficiently restricted to prevent a sudden accumulation of pressure in motors 12 of such intensity as to cause damage to the various parts of motors 12.

As valve 88 begins to enter its open or flow position, lines 52 and 54 are connected to lines 94 and 96 through orifices 53 and 55, respectively. As can be appreciated, through the intermediate position of valve 88, and as valve 88 begins to enter its open or flow position, the pressure supplied to motors 12, through dividers 100, is gradually increased so that rollers 28 continue to more gently be further urged toward cam-formed bosses 26. The amount of time that pressure is being delivered to lines 94 and 96 through orifice 53 or 55 must be sufficient for rollers 28 to become fully engaged against cam-formed bosses 26, and is determined by the rate of shifting of valve 88. A shifting rate control means or orifice 103 is provided in line 92 to restrict the flow of hydraulic fluid between valve 88 and valve 86. Orifice 103 is of a proper size to correctly control the rate of shifting of valve 88.

Finally, when valve 88 is fully biased to its open or flow position, primary pump supply and return lines 52 and 54 are connected to respective motor supply and return lines 94 and 96 and, further, line 90 carrying charge pressure is disconnected therefrom. However, line 90 continues to provide charge pressure to biasing port 102 so that valve 88 may continue to remain in its second or flow position. As can be appreciated, high pressure power hydraulic fluid is now delivered from primary pump 50 to motors 12 and, thereafter, is returned back to primary pump 50.

Dividers 100 serve to, in a known and customary manner, divide the high pressure power hydraulic fluid between the two motors 12 according to need. That is, in the event that one of wheels 14 experiences a low friction area such as ice or mud and begins to spin, dividers 100 will cause more of the high pressure power hydraulic fluid to be delivered to motor 12 connected to the wheel which is not spinning. Accordingly, dividers 100 serve to deliver high pressure power hydraulic fluid to power motors 12 according to need and with respect to the friction experienced by the respective wheels 14 coupled to motors 12.

When solenoid-controlled valve 86 is deenergized and again placed in its first or closed position, as shown in FIG. 3, charge pressure is again delivered to biasing port 104 through line 92 so that valve 88 can be biased back to its first or closed position as shown in FIG. 3. During this shifting of valve 86, line 90 is connected to line 98 leading to reservoir 46. Thus, when the intermediate position of valve 88 is reached, pressure within either of motor supply and return lines 94 or 96 and within lines 52 and 54 leading to primary pump 50, is allowed to drain through lines 90 and 98 to reservoir 46. If sufficient flow is drained from lines 94, 96, 52, or 54, sufficient pressure may accumulate in biasing port 102 to counteract the pressure in biasing port 104 and the force of spring 114, thereby causing valve 88 to be suspended in its intermediate position. Therefore, channel orifice means or orifice 105 is provided to sufficiently restrict flow being drained from lines 94, 96, 52, or 54 to line 90, thus sufficiently decreasing the accumulation of pressure in biasing port 102. Thereafter, when valve 88 reaches its first or closed position, as shown in FIG. 3, lines 52 and 54 are disconnected and any residual pressure within motors 12 is allowed to drain into reservoir 46, again through lines 90 and 98.

Figure 4:
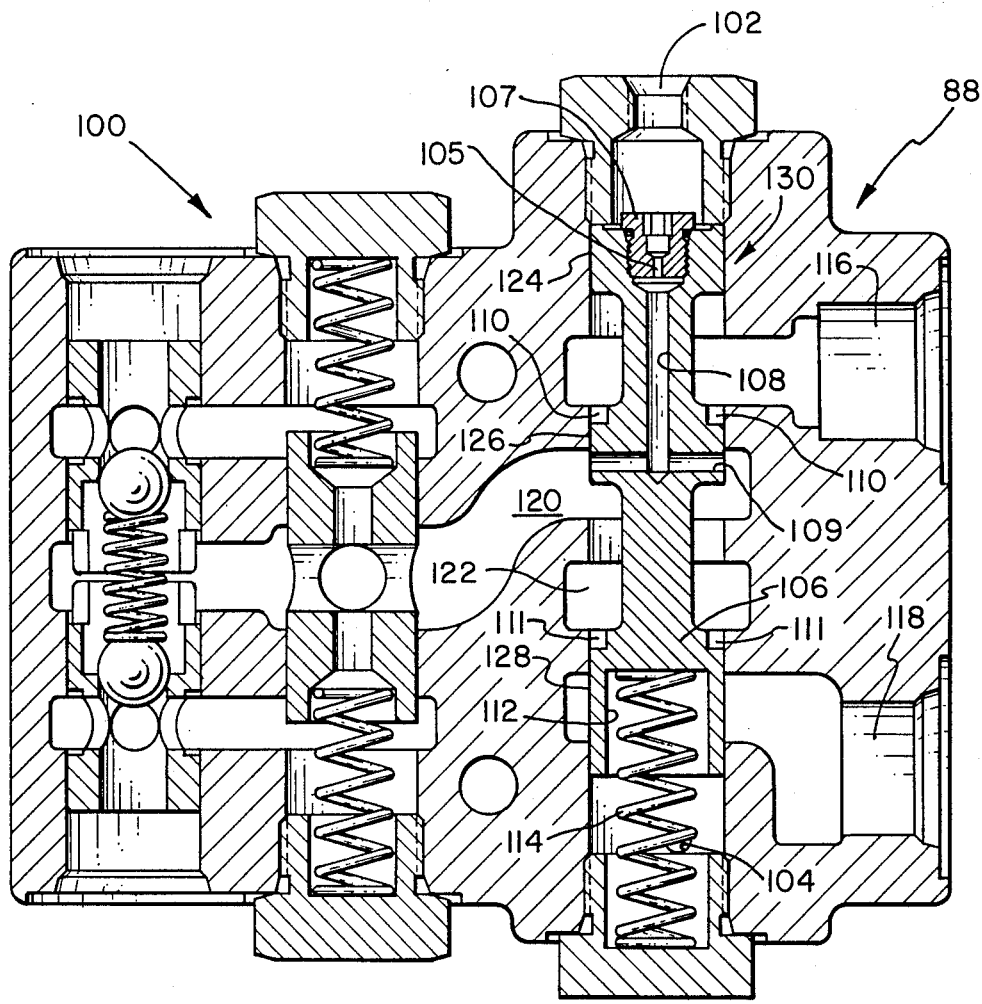
FIG. 4 is a cut-away view of the two-position five-way valve of the control valve shown in FIG. 3 in its first or closed position and also showing a divider mechanism.
Figure 5:
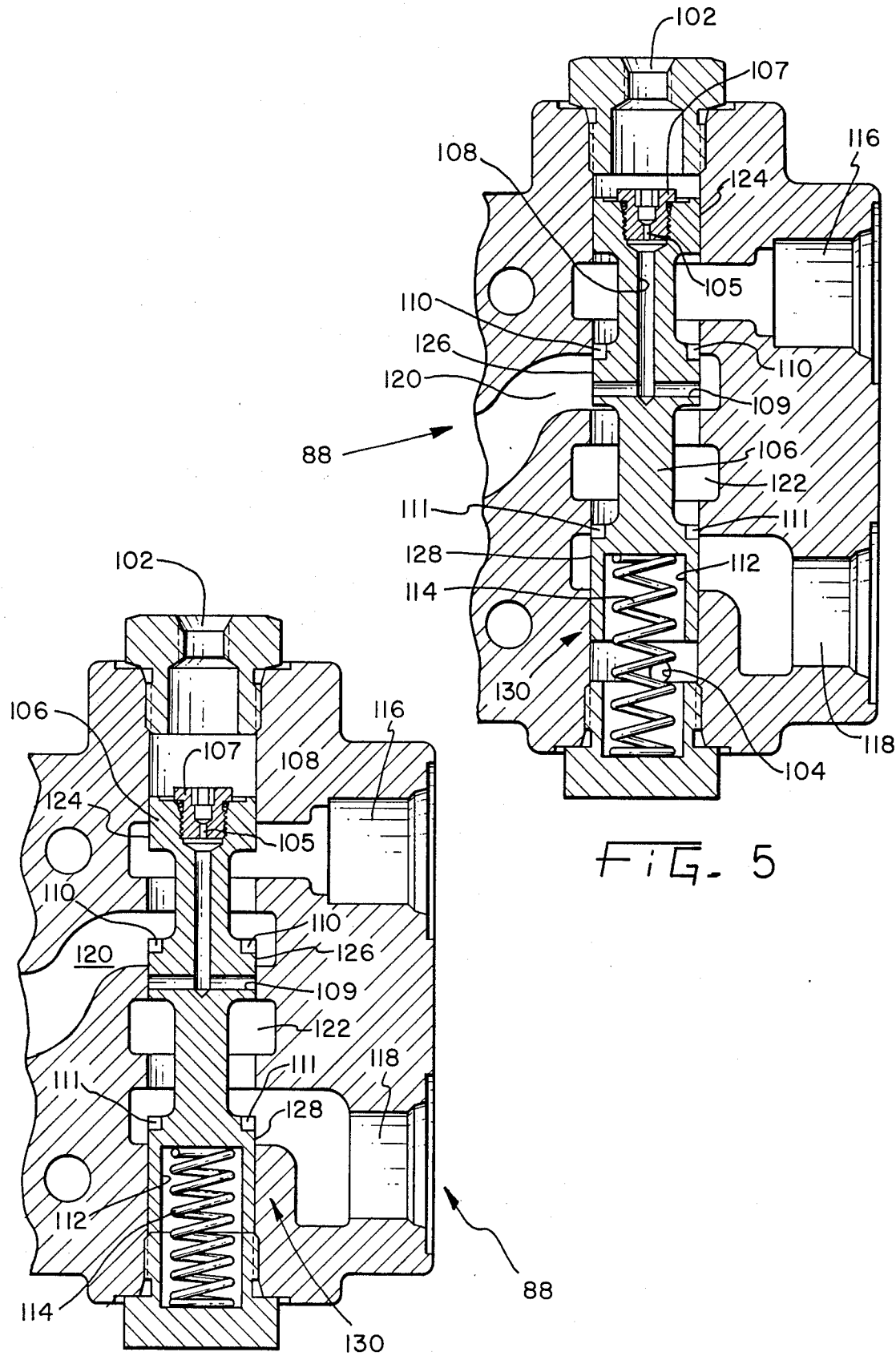
FIG. 5 is a cut-away view of the two-position five-way valve shown in FIG. 4 in its intermediate position.
Figure 6:
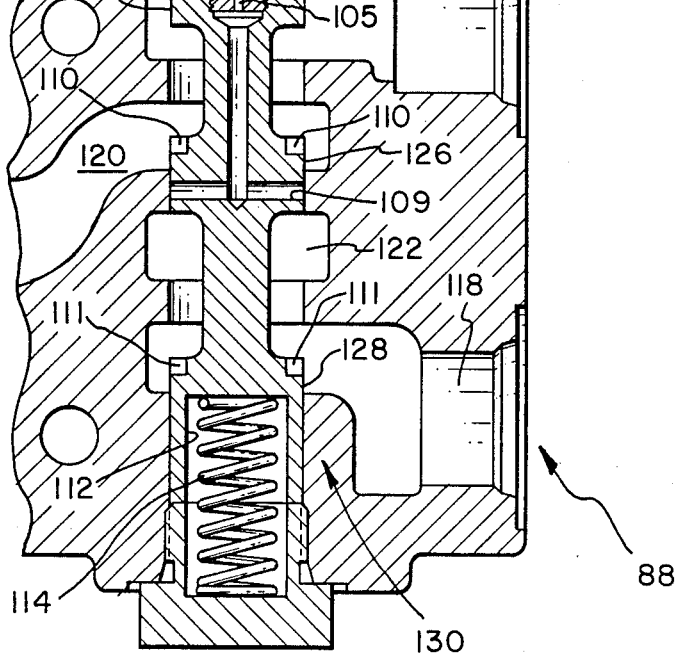
FIG. 6 is a cut-away view of the two-position five-way valve shown in FIG. 4 in its second or flow position.
Figure 8:
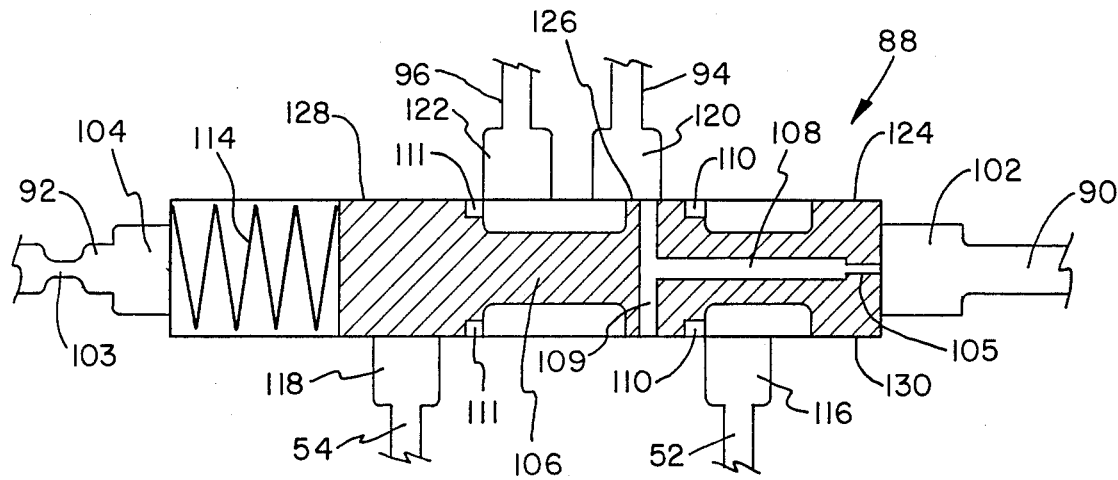
FIG. 8 is a generally schematic view of the two-position five-way valve shown in FIG. 3 in its first or closed position.
Figure 9:
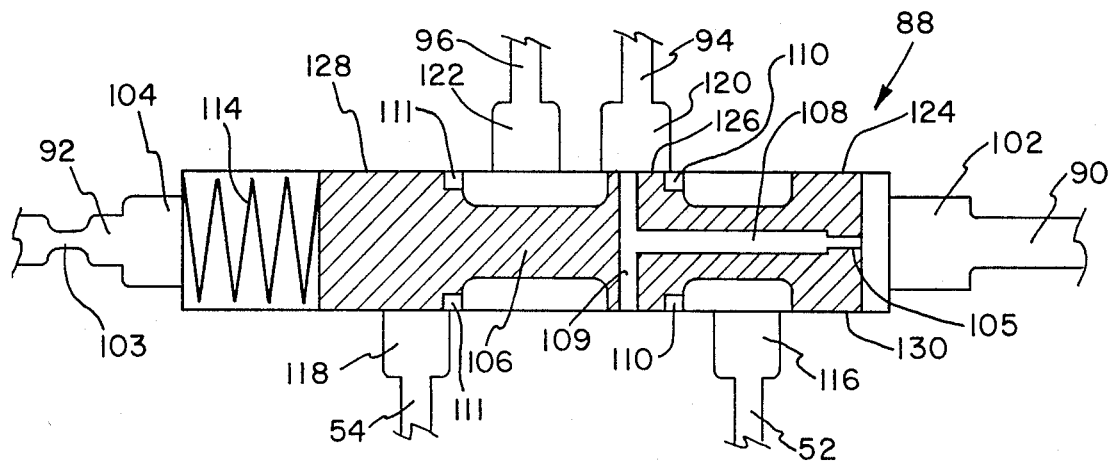
FIG. 9 is a generally schematic view of the two-position five-way valve shown in FIG. 3 and in its intermediate position; and, FIG. 10 is a generally schematic view of the two-position five-way valve shown in FIG. 3 and in its second or flow position.
Figure 10:
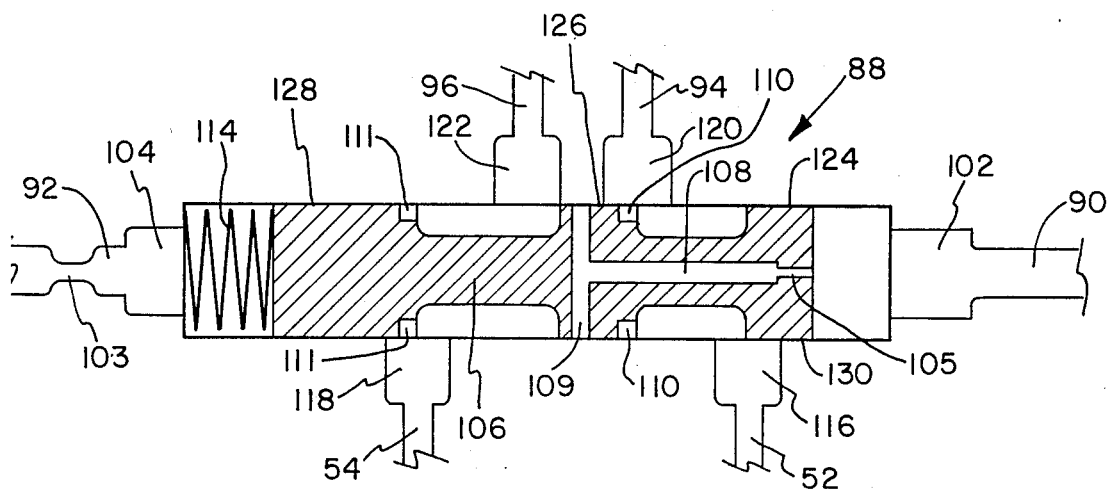

More specifically, the mechanical elements and the operating positions of the two-position five-way valve 88 are shown in FIGS. 4-6 and 8-10. FIGS. 4-6 show valve 88 as would actually be manufactured in a steel casing while FIGS. 8-10 show valve 88 generally schematically. FIG. 4 also shows the mechanical elements of a known and customary divider generally indicated as 100.

Valve 88 includes spool means or spool 106 adapted to be axially shifted between the positions as shown in FIGS. 4-6 and 8-10. Spool 106 is shaped so as to selectively interconnect the various lines communicating with valve 88. More specifically, spool 106 has spool lands 124, 126 and 128 and is adapted to axially slide within spool housing 130, which is connected at various locations thereof to input ports 116 and 118, output ports 120 and 122, and with biasing ports 102 and 104. Lines 52 and 54 connected to primary pump 50 are connected to either first or second input ports 116 or 118. Further, motor supply and return lines 94 and 96 are connected to either of output ports 120 or 122. As shown in FIGS. 8-10, lines 52 and 54 are connected to ports 116 and 118 respectively and lines 94 and 96 are connected to ports 120 and 122 respectively. Further yet, as discussed above, line 92 containing shifting rate control means or orifice 103 is connected to biasing port 104 and line 90 is connected to biasing port 102. It should be noted that hydraulic fluid, at charge pressure, which is provided to biasing port 104, serves to, along with the aid of spool spring 114 located within recess 112, push or bias spool 106 upwardly and towards biasing port 102. However, hydraulic fluid at charge pressure provided to biasing port 102 serves two functions. First, the hydraulic fluid at charge pressure serves to bias or shift spool 106 downwardly towards biasing port 104. Second, the fluid at charge pressure provided at biasing port 102 in combination with a channel means, substantially made up of axial orifice insert 107 providing channel orifice means or orifice 105, channel 108 and transverse channel 109, all located in spool 106, act as another input and output port wherethrough line 90 can selectively communicate with the other lines leading into and connected to valve 88. It should also be noted that spool 106 has notches 110, which collectively form orifice 53, and notches 111, which collectively form orifice 55, located in two of its radial outward corners on each of lands 126 and 128 respectively.

The operation of valve 88 as spool 106 is shifted is described hereinbelow. As shown in FIGS. 4 and 8, spool 106 is in its uppermost first or closed position wherein input ports 116 and 118, connected to lines 52 and 54, are closed. Further, output ports 120 and 122 connected to lines 94 and 96 communicate with each other and, further, communicate through channels 109 and 108 and orifice 105 with line 90. As discussed above, line 90, when valve 86 is in its first or deenergized position as shown in FIG. 3, is connected to line 98 leading to reservoir 46. Further, during the energizing of valve 86 and placing the same in its second position, charge pressure is delivered through line 90 to biasing port 102 whereat the charge pressure then flows through orifice 105 and channels 108 and 109 and through output ports 120 and 122 to lines 94 and 96 and ultimately to motors 12. The charge pressure delivered to port 102, however, also creates the necessary force to bias or shift spool 106 downwardly toward its intermediate position as shown in FIGS. 5 and 9.

The intermediate position of spool 106, as shown in FIGS. 5 and 9, allows for communication between all of ports 116, 118, 120, 122 and with port 102 through orifice 105 and channels 108 and 109. Notches 110 and 111 act as temporary orifices and serve to more gradually provide the flow of high pressure power hydraulic fluid from port 118 into port 122 or, from port 116 into port 120 depending on which of ports 116 or 118 is at that time acting as the supply or return line to primary pump 50.

It should also be noted that, in the preferred embodiment, the intermediate position of spool 106 is maintained for approximately 1/16 of one inch axial travel of spool 106.

After the intermediate position, spool 106 reaches its second or flow position as shown in FIGS. 6 and 10 whereat channels 109 and 108 leading to line 90 are closed and, further, port 116 is open to port 120 and port 118 is open to port 122.

While the invention has been described as having a specific embodiment, it will be understood that it is capable of further modification. This application is, therefore, intended to cover any variations, uses or adaptations of the invention following the general principles thereof and including such departures from the present disclosure as come within known or customary practice in the art to which this invention pertains.

What is claimed is:

1. A valve for selectively controlling the flow of a fluid at a first pressure and the flow of the fluid at a second pressure, said valve comprising:
   a first pressure input;
   a second pressure input;
   a fluid output;
   spool means for selectively directing the fluid at a first pressure from said first pressure input to said fluid output;
   spool control means for shifting said spool means between a closed position and a flow position; and
   channel means for directing the fluid at the second pressure from said second pressure input to said fluid output when said spool means is being shifted from said closed position to said flow position.

2. The valve of claim 1 wherein said spool control means controls said spool means by selectively providing the fluid at the second pressure to a spool control port located on said valve and communicating with said spool means.

3. The valve of claim 2 wherein said selective providing of the fluid at the second pressure is accomplished by a solenoid valve which can be electrically controlled from a remote location.

4. The valve of claim 1 further comprising a reservoir output and wherein when said spool means is in its closed position, said channel means provides communication between said fluid output and said reservoir output.

5. The valve of claim 1 wherein when said spool means is being shifted from said closed position to said flow position, after said channel means directs the fluid at the second pressure from said second pressure input to said fluid output and before said spool means reaches its flow position, said spool means travels through an intermediate position wherein said first pressure input, said second pressure input, and said fluid output all communicate with each other.

6. The valve of claim 1 wherein said spool means includes notch means for gradually directing the fluid at the first pressure from said first pressure input to said fluid output as said spool means is shifted from said closed position to said flow position.

7. The valve of claim 1 wherein said channel means includes channel orifice means for controlling the rate of flow of fluid between said second pressure input and said fluid output.

8. The valve of claim 1 wherein said spool control means includes shifting rate control means for controlling the rate of shifting of said spool means.

9. In a fluid motor control system, a valve for selectively controlling the flow of a fluid at a first pressure and the flow of the fluid at a second pressure, said valve comprising:
   a first pressure input;
   a second pressure input;
   a fluid output;
   spool means for selectively directing the fluid at a first pressure from said first pressure input to said fluid output;
   spool control means for shifting said spool means between a closed position and a flow position;
   channel means for directing the fluid at the second pressure from said second pressure input to said fluid output, when said spool means is being shifted from said closed position to said flow position; and,
   a fluid motor in communication with said fluid output and wherein the fluid at first pressure powers said motor while the fluid at the second pressure provides preliminary pressure to said motor.

10. The valve of claim 9 wherein said fluid motor includes accumulator means for absorbing pressure within said motor caused by the fluid at the first pressure substantially during the shifting of said spool means from said closed position to said flow position.

11. A valve for selectively controlling the flow of a fluid at a first pressure through the use of a fluid at a second pressure, said valve comprising:
   a first pressure input;

a second pressure input;

a fluid output;

spool means for selectively directing the fluid at the first pressure from said first pressure input to said fluid output;

spool control means for shifting said spool means through the use of the fluid at the second pressure, said spool control means shifting said spool means between a closed position and a flow position; and channel means for directing the fluid at the second pressure from said second pressure input to said fluid output when said spool means is being shifted from said closed position to said flow position.

12. The valve of claim 11 further comprising a reservoir output and wherein when said spool means is in its closed position, said channel means provides communication between said fluid output and said reservoir output.

13. The valve of claim 11 wherein when said spool means is being shifted from said closed position to said flow position, after said channel means directs the fluid at the second pressure from said second pressure input to said fluid output and before said spool means reaches its flow position, said spool means travels through an intermediate position wherein said first pressure input, said second pressure input, and said fluid output all communicate with each other.

14. The valve of claim 11 wherein said spool means includes notch means for gradually directing the fluid at the first pressure from said first pressure input to said fluid output as said spool means is shifted from said closed position to said flow position.

15. The valve of claim 11 wherein said channel means includes channel orifice means for controlling the rate of flow of fluid between said second pressure input and said fluid output.

16. The valve of claim 11 wherein said spool control means includes shifting rate control means for controlling the rate of shifting of said spool means.

17. In a fluid motor control system, a valve for selectively controlling the flow of a fluid at a first pressure through the use of a fluid at a second pressure, said valve comprising:

a first pressure input;

a second pressure input;

a fluid output;

spool means for selectively directing the fluid at the first pressure from said first pressure input to said fluid output;

spool control means for shifting said spool means through the use of the fluid at the second pressure, said spool control means shifting said spool means between a closed position and a flow position;

channel means for directing the fluid at the second pressure from said second pressure input to said fluid output when said spool means is being shifted from said closed position to said flow position; and, a fluid motor in communication with said fluid output and wherein the fluid at the first pressure powers said motor.

18. The valve of claim 17 wherein said fluid motor includes accumulator means for absorbing pressure within said motor caused by the fluid at the first pressure substantially during the shifting of said spool means from said closed position to said flow position.

19. The valve of claim 11 further comprising solenoid means connected to said spool control means for operating said spool control means and thereby selectively shifting said spool means.

20. In a pressure operating mechanism control system, a two-position five-way valve for controlling the flow of a fluid at a first pressure and the flow of the fluid at a second pressure, said valve comprising:

a first and a second port for connecting two respective supply and return lines of the fluid at the first pressure;

a third and a fourth port for connecting two respective supply and return lines of a pressure-operating mechanism;

a fifth port;

valve control means for selectively shifting the position of said two-position five-way valve between a first closed position and a second open position and for selectively causing said fifth port to communicate with either a reservoir or the fluid at the second pressure;

wherein when said two-position five-way valve is in its first closed position, said third and fourth ports communicate with said fifth port, said valve control means causes said fifth port to communicate with the reservoir and said first and second ports are closed;

wherein when said two-position five-way valve is in its second open position, said fifth port is closed and said first and second ports communicate with respective third and fourth ports thereby causing fluid at the first pressure to be supplied and returned from the pressure-operating mechanism; and, wherein when said two-position five-way valve is being shifted from said first closed position to said second open position, said third and fourth ports temporarily communicate with said fifth port while said valve control means causes said fifth port to communicate with the fluid at the second pressure, thereby temporarily causing fluid at the second pressure to be delivered to the pressure-operating mechanism.

21. The valve of claim 20 further comprising solenoid means coupled to said valve control means for electrically operating said valve control means from a remote location.

22. The valve of claim 20 further comprising flow divider means in communication with and between said third and fourth ports and the pressure-operating mechanism including two motors for dividing and directing the fluid at the first pressure to the motors according to need.

23. The valve of claim 20 further comprising accumulator means communicating with said third and fourth ports for absorbing pressure caused by the fluid at the first pressure substantially during the shifting of said two-position five-way valve from its first closed position to its second open position.

24. The valve of claim 20 wherein said third and fourth ports communicate with the pressure-operating mechanism including a motor, said motor including accumulator means for absorbing pressure caused by the fluid at the first pressure substantially during the shifting of said two-position five-way valve from its first closed position to its second open position.

25. The valve of claim 20 further comprising an intermediate temporary position between said first closed position and said second open position wherein all of said first, second, third, fourth and fifth ports communicate with each other.

26. The valve of claim 20 further comprising orifice means for controlling the rate of flow of fluid between said fifth port and said third and fourth ports.

27. The valve of claim 20 wherein said valve control means includes shifting rate control means for controlling the rate of shifting of said two-position five-way valve between said first and said second positions.

28. The valve of claim 20 further comprising notch means for gradually directing fluid at the first pressure between said first and second ports and said third and fourth ports.

29. A method for energizing and deenergizing a pressure-operating mechanism with a fluid at a first pressure and a fluid at a second pressure and through the use of a valve having a first pressure input connected to the fluid at the first pressure, a second pressure input selectively connected to either the fluid at the second pressure or a reservoir, and spool means for providing selective communication between said first and said second pressure inputs and said fluid output, said method comprising the steps of:

deenergizing the pressure-operating mechanism by disconnecting the first pressure input from the fluid output and connecting the fluid output to the second pressure input thereby allowing residual pressure within the pressure-operating mechanism to drain into the reservoir;

energizing the pressure-operating mechanism by first connecting the fluid output to the second pressure input thereby first providing fluid at the second pressure to the pressure-operating mechanism and, thereafter, disconnecting said fluid output from said second pressure input and connecting the first pressure input to the fluid output thereby providing fluid at the first pressure to said pressure-operating mechanism and thus fully energizing the pressure-operating mechanism.

30. The method of claim 29 further comprising after the step of first connecting the fluid output to the second pressure input and before the step of connecting the first pressure input to the fluid output during the step of energizing the pressure-operating mechanism, the step of momentarily connecting together the first pressure input, the second pressure input and the fluid output.

31. The method of claim 29 wherein the pressure-operating mechanism to be energized and deenergized is a plurality of fluid motors and further comprising the step of dividing the flow of fluid at the first pressure between the motors according to need.

32. The method of claim 29 further comprising the step of absorbing sudden pressure caused by the fluid at the first pressure during the step of energizing.

* * * * *